United States Patent [19]

Sawdon et al.

[11] Patent Number: 5,208,974
[45] Date of Patent: May 11, 1993

[54] APPARATUS FOR ATTACHING A FASTENER TO SHEET MATERIAL

[75] Inventors: Stephen B. Sawdon, Marysville; Edwin G. Sawdon, St. Clair, both of Mich.

[73] Assignee: BTM Corporation, Marysville, Mich.

[21] Appl. No.: 736,499

[22] Filed: Jul. 26, 1991

Related U.S. Application Data

[60] Continuation-in-part of Ser. No. 694,141, May 1, 1991, Pat. No. 5,150,513, which is a division of Ser. No. 468,579, Jan. 23, 1990, Pat. No. 5,027,503, which is a division of Ser. No. 175,941, Mar. 31, 1988, Pat. No. 4,910,853, which is a division of Ser. No. 853,130, Apr. 17, 1986, Pat. No. 4,757,609, which is a continuation-in-part of Ser. No. 607,948, May 7, 1984, abandoned, which is a division of Ser. No. 495,440, May 17, 1983, Pat. No. 4,459,735, which is a continuation of Ser. No. 184,951, Sep. 8, 1980, abandoned.

[51] Int. Cl.⁵ .............................................. B23P 19/00
[52] U.S. Cl. ..................................... 29/798; 29/243.5; 29/283.5
[58] Field of Search .................... 29/238, 243.5, 283.5, 29/798, 509, 432, 432.1, 432.2

[56] References Cited

U.S. PATENT DOCUMENTS

| | | |
|---|---|---|
| Re. 31,535 | 3/1984 | Schleicher . |
| 679,137 | 7/1901 | Baxter . |
| 988,154 | 3/1911 | Thiemer . |
| 1,283,799 | 11/1918 | Kerr . |
| 1,456,079 | 5/1923 | Stuebner . |
| 1,509,997 | 9/1924 | Fry . |
| 1,919,999 | 7/1933 | Borton . |
| 1,926,686 | 9/1933 | Newton . |
| 1,969,214 | 8/1934 | Daude . |
| 1,985,333 | 12/1934 | Wiley . |
| 2,004,182 | 6/1935 | Arey . |
| 2,254,558 | 9/1941 | Williams . |
| 2,333,966 | 11/1943 | Weiss . |
| 2,404,197 | 7/1946 | Sirp . |
| 2,430,377 | 11/1947 | Vorreyer . |
| 2,467,969 | 4/1949 | Debrot, Jr. . |
| 2,555,836 | 6/1951 | Werich . |
| 2,619,855 | 12/1952 | Williams . |
| 2,626,687 | 1/1953 | Williams . |
| 2,632,929 | 3/1953 | Poupitch . |
| 2,663,072 | 12/1953 | Pfistershammer . |
| 2,671,361 | 3/1954 | Sandberg . |
| 2,685,719 | 8/1954 | Golden . |
| 2,713,197 | 7/1955 | Schmidt . |
| 2,865,451 | 12/1958 | Ihrig . |
| 2,924,312 | 2/1960 | Williams . |
| 2,937,681 | 5/1960 | Pattern . |

(List continued on next page.)

FOREIGN PATENT DOCUMENTS 1237574  6/1988  Canada .

(List continued on next page.)

OTHER PUBLICATIONS

BTM Corporation-Stud-Loc Strength Data-1 page.
BTM Corporation-Tog-L-Loc and Lance-n-Loc Sheet Metal Joining Without Welding-6 pages.
BTM Corporation-Tog-l-Loc Sheet Metal Joining System-16 pages.

Primary Examiner—P. W. Echols
Assistant Examiner—David P. Bryant
Attorney, Agent, or Firm—Harness, Dickey & Pierce

[57] ABSTRACT

An apparatus is employed for forming an attachment of a threaded fastener or other item to a deformable sheet material by a clinching technique, preferably without shearing the sheet material in the area of the interlocking attachment of the fastener with the sheet material. As a result, a secure, interlocked, joint is formed to which other items can be threadably secured, with such joint being leakproof in some embodiments. Such leakproof fastener assembly is especially advantageous in the manufacture of fluid-containing products or other applications where a leakproof construction is necessary or desirable. In other embodiments, however, where such leakproof feature is not needed or is undesirable, the invention still provides an improved, secure, interlocked attachment of a fastener to a sheet material item, wherein the sheet material item is a single layer item or a multiple layer item.

66 Claims, 9 Drawing Sheets

U.S. PATENT DOCUMENTS

| | | |
|---|---|---|
| 3,157,942 | 11/1964 | MacLean, Jr. |
| 3,177,914 | 4/1965 | MacLean, III et al. |
| 3,178,749 | 4/1965 | Heepe |
| 3,187,796 | 6/1965 | Double |
| 3,198,155 | 8/1965 | Fraze |
| 3,202,112 | 8/1965 | Oakley |
| 3,233,259 | 2/1966 | MacLean, III et al. |
| 3,315,345 | 4/1967 | Double et al. |
| 3,338,463 | 8/1967 | Henrickson |
| 3,357,388 | 12/1967 | Dunn |
| 3,359,935 | 12/1967 | Rosbottom |
| 3,404,648 | 10/1968 | Rosbottom |
| 3,439,723 | 4/1969 | Double et al. |
| 3,451,367 | 6/1969 | Henrickson |
| 3,469,613 | 9/1969 | Steward |
| 3,470,596 | 10/1969 | Belada |
| 3,506,050 | 4/1970 | Pouch et al. |
| 3,599,318 | 8/1971 | Behlen |
| 3,615,274 | 10/1971 | Belada |
| 3,726,000 | 4/1973 | Hafner |
| 3,771,216 | 11/1973 | Johnson |
| 3,791,016 | 2/1974 | Eberhardt et al. |
| 3,810,290 | 5/1974 | Grube |
| 3,829,957 | 8/1974 | Pouch et al. |
| 3,862,485 | 1/1975 | Hafner |
| 3,865,047 | 2/1975 | Hlinsky et al. |
| 3,877,133 | 4/1975 | Grube |
| 3,885,299 | 5/1975 | Hafner |
| 3,900,937 | 8/1975 | Schleicher |
| 3,919,955 | 11/1975 | DuVernay |
| 3,920,059 | 11/1975 | Grube |
| 3,921,276 | 11/1975 | Oaks |
| 3,924,378 | 12/1975 | Hafner |
| 3,934,327 | 1/1976 | Hafner |
| 3,969,808 | 7/1976 | Goodsmith et al. |
| 3,981,064 | 9/1976 | Hafner |
| 3,999,659 | 12/1976 | Grube |
| 4,035,901 | 7/1977 | Lux et al. |
| 4,059,897 | 11/1977 | Marquis |
| 4,064,617 | 12/1977 | Oaks |
| 4,069,902 | 1/1978 | Zdeb |
| 4,094,352 | 6/1978 | Hlinsky |
| 4,153,989 | 5/1979 | Shinjo |
| 4,203,187 | 5/1980 | Grube |
| 4,208,776 | 6/1980 | Schleicher |
| 4,237,567 | 12/1980 | Grube |
| 4,242,793 | 1/1981 | Matthews et al. |
| 4,269,248 | 5/1981 | MacLean et al. |
| 4,281,699 | 8/1981 | Grube |
| 4,384,667 | 5/1983 | Smallegan et al. |
| 4,394,794 | 7/1983 | Shirey |
| 4,459,735 | 7/1984 | Sawdon |
| 4,484,385 | 11/1984 | Woods |
| 4,525,912 | 7/1985 | Kazino et al. |
| 4,531,279 | 7/1985 | Gunter |
| 4,569,111 | 2/1986 | Mutou |
| 4,574,453 | 3/1986 | Sawdon |
| 4,574,473 | 3/1986 | Sawdon |
| 4,601,090 | 7/1986 | Gunter |
| 4,610,072 | 9/1986 | Muller |
| 4,722,647 | 2/1988 | Sawdon |
| 4,752,993 | 6/1988 | Oaks |
| 4,757,609 | 7/1988 | Sawdon |
| 4,803,767 | 2/1989 | Obrecht et al. |
| 4,878,284 | 11/1989 | Sawdon |
| 4,910,853 | 3/1990 | Sawdon |
| 5,027,503 | 7/1991 | Sawdon |
| 5,031,442 | 7/1991 | Kynl |

FOREIGN PATENT DOCUMENTS

| | | |
|---|---|---|
| 98517 | 8/1898 | Fed. Rep. of Germany |
| 1452650 | 2/1973 | Fed. Rep. of Germany |
| 3210208 | 11/1984 | Fed. Rep. of Germany |
| 415589 | 3/1941 | Japan |
| 4214680 | 8/1942 | Japan |
| 4842707 | 12/1973 | Japan |
| 54-113753 | 9/1979 | Japan |
| 56-59540 | 5/1981 | Japan |
| 664979 | 1/1952 | United Kingdom |
| 708236 | 4/1954 | United Kingdom |
| 895561 | 5/1962 | United Kingdom |
| 930164 | 7/1963 | United Kingdom |
| 934101 | 8/1963 | United Kingdom |
| 945110 | 12/1963 | United Kingdom |
| 1008914 | 11/1965 | United Kingdom |
| 1041119 | 9/1966 | United Kingdom |
| 1101795 | 1/1968 | United Kingdom |
| 1114826 | 5/1968 | United Kingdom |
| 1202275 | 8/1970 | United Kingdom |
| 1378534 | 12/1974 | United Kingdom |
| 1551353 | 8/1979 | United Kingdom |
| 2055648A | 3/1981 | United Kingdom |
| 2069394A | 8/1981 | United Kingdom |
| 2071000B | 9/1981 | United Kingdom |

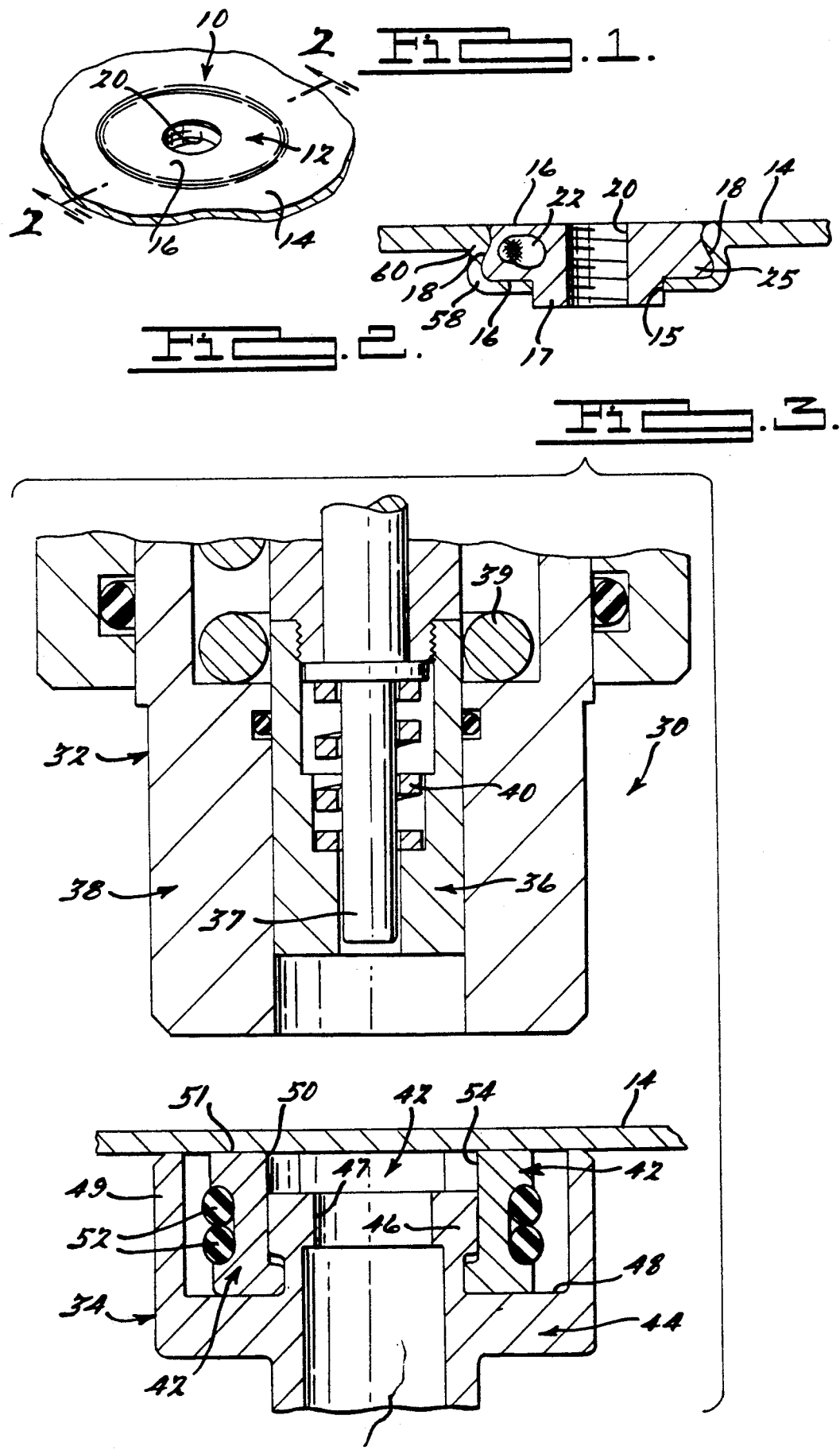

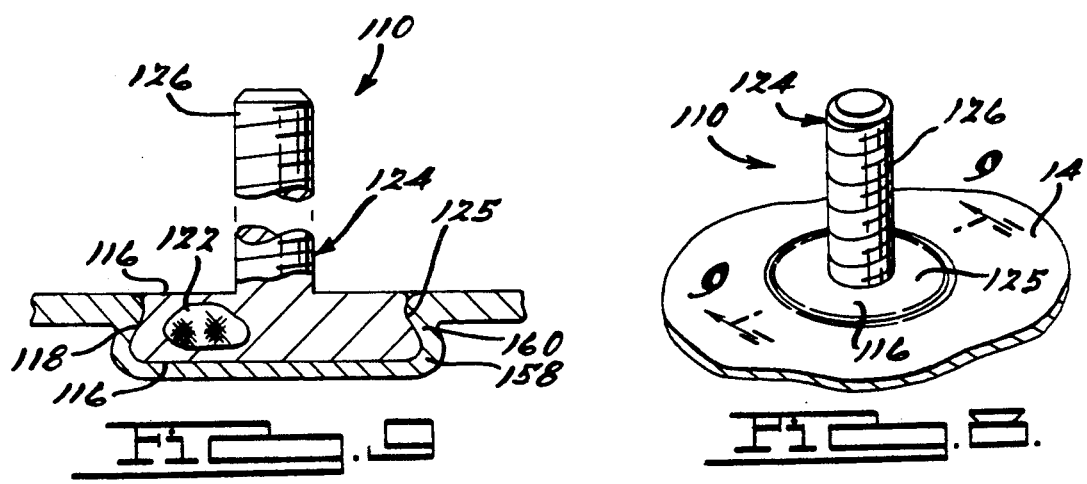
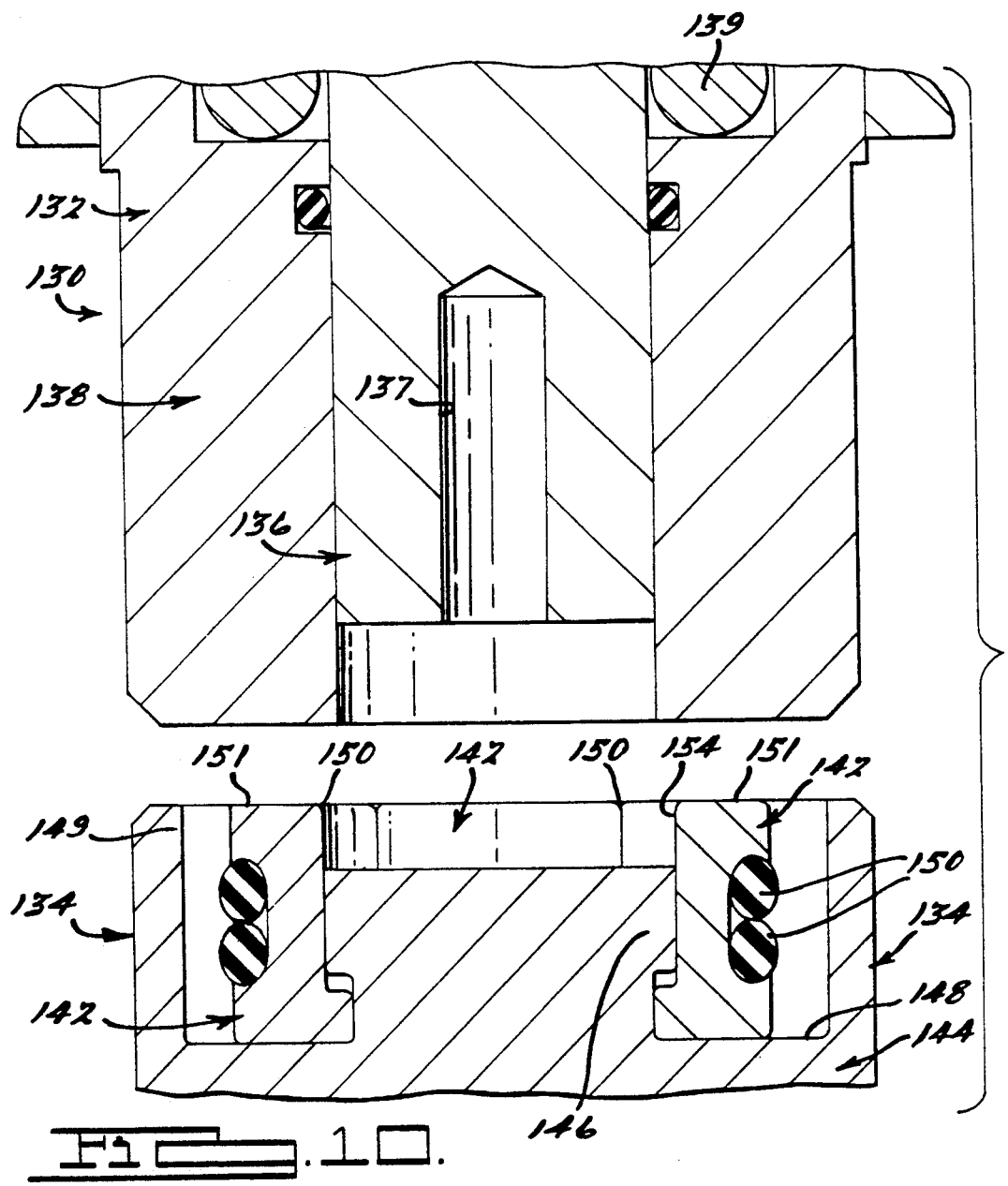

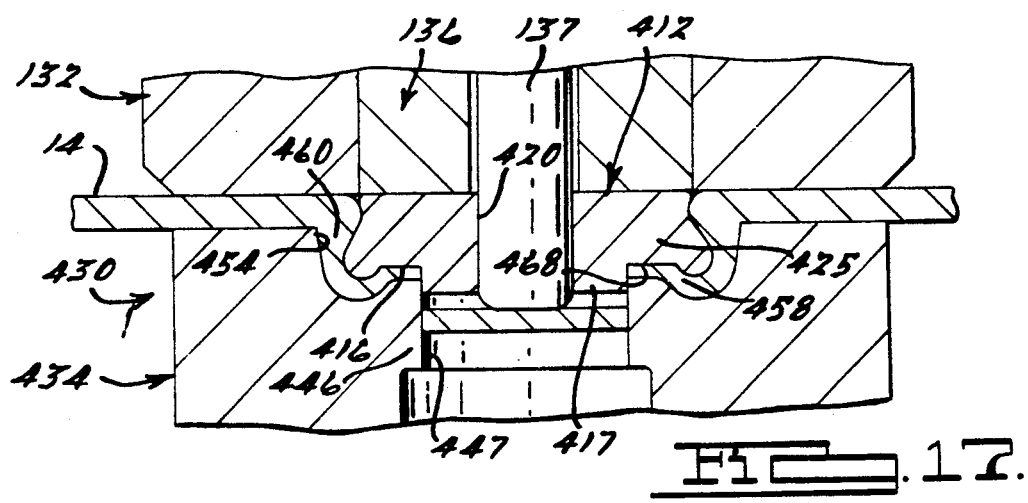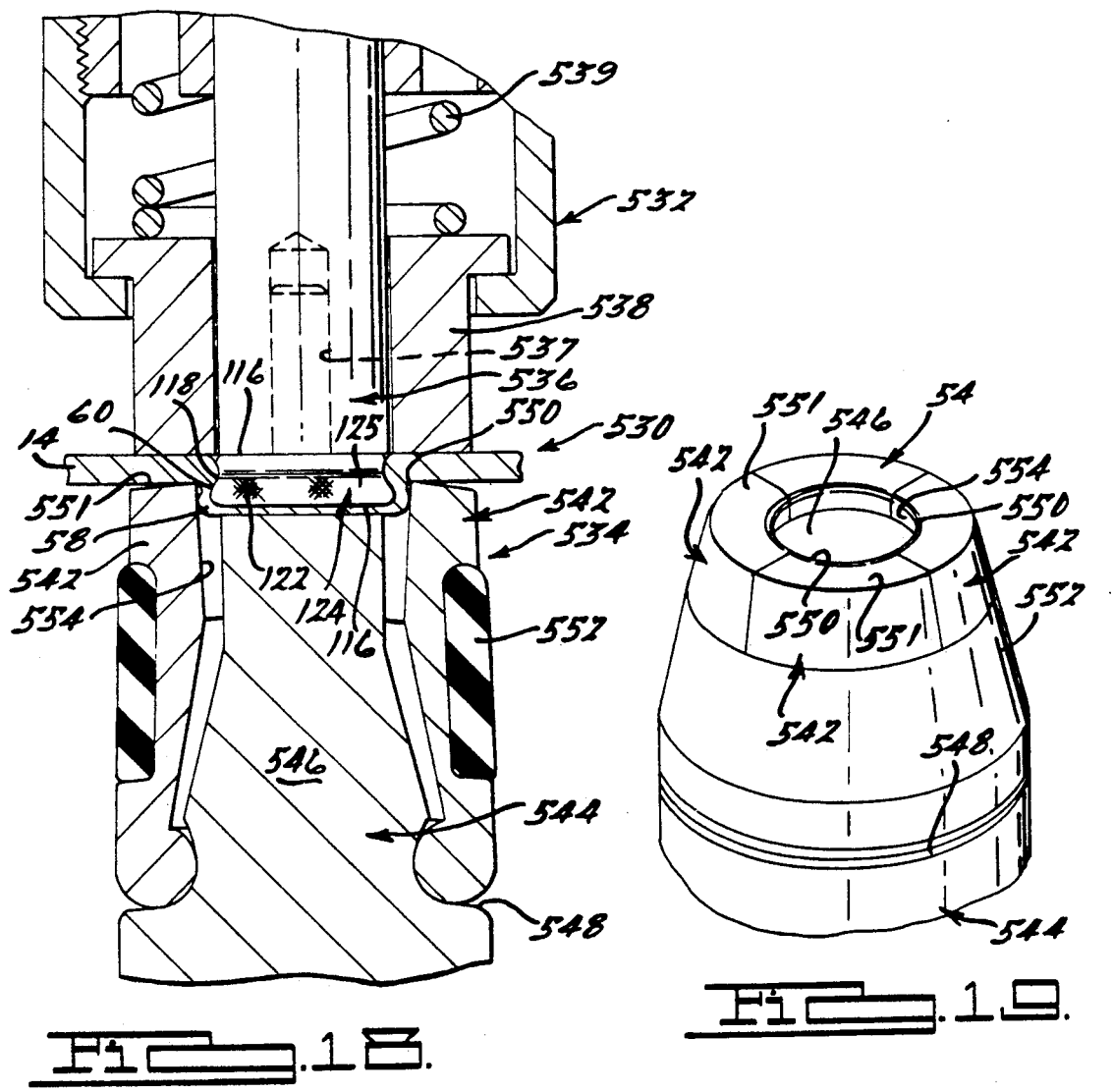

APPARATUS FOR ATTACHING A FASTENER TO SHEET MATERIAL

This application is a continuation-in-part of copending application Ser. No. 694,141, filed May 1, 1991, now issued as U.S. Pat. No. 5,150,513, which was a divisional of application Ser. No. 468,579, filed Jan. 23, 1990, now issued as U.S. Pat. No. 5,027,503, which was a divisional of application Ser. No. 175,941, filed Mar. 31, 1988, now issued as U.S. Pat. No. 4,910,853, which was a divisional of application Ser. No. 853,130, filed Apr. 17, 1986, now issued as U.S. Pat. No. 4,757,609, which was a continuation-in-part of application Ser. No. 607,948, filed May 7, 1984, now abandoned, which was a divisional of application Ser. No. 495,440, filed May 17, 1983, now issued as U.S. Pat. No. 4,459,735, which was a continuation of application Ser. No. 184,951, filed Sep. 8, 1980, now abandoned, all of which being assigned to the same assignee as that of the present invention, and the disclosures of all of which are hereby incorporated by reference herein.

BACKGROUND AND SUMMARY OF THE INVENTION

The invention relates to a self-attaching fastener and more particularly to a threaded fastener, mounting pin or shaft, or other item that is forcibly mechanically interlocked with, or clinchingly attached to, a portion of a sheet material item. The invention also involves an apparatus and a method for forming such an attachment. Such attachment is accomplished in some embodiments without shearing the sheet material item in order to form a leakproof attachment of the fastener.

It is frequently desirable to secure objects to a member formed from a relatively thin sheet material, such as sheet metal, deformable sheet plastics, or other such sheet materials. Because such sheet materials are generally too thin to form adequate threaded holes therein by drilling and tapping, threaded male or female fasteners are frequently welded or otherwise secured to such sheet materials.

In this regard, reference is made to U.S. Pat. Nos. 4,574,453 and 4,574,473, both of which are assigned to the same assignee as the present invention, wherein a method and an apparatus for securing a fastener to a sheet material item are disclosed and claimed. Both of these patents are hereby incorporated by reference herein. The method and apparatus of such patents both involve forcing the fastener or a portion thereof into the sheet material in a manner by which a part of the sheet material is sheared, and an interlocking attachment or connection is made between the fastener and the sheet material. As a result, the attachment formed by such method and apparatus does not result in a leakproof attachment of at least a male threaded fastener to a sheet material item.

The present invention overcomes this disadvantage by allowing fasteners to be attached or secured to a sheet material member without shearing the sheet material at all in some embodiments, thereby providing for such an attachment in areas where a leakproof assembly is necessary or desirable, such as in the production of items that are used to contain fluids, for example. In other embodiments, where shearing is necessary or desirable, such shearing occurs in an area of the joint that does not involve the interlock between the sheet material and the fastener or other item.

According to the present invention, a fastener having an attachment portion with a lateral face and a transverse edge thereon is attached to either a single or multiple layer sheet material item. The apparatus and method for forming such an attachment preferably involves a pair of die means movable relative toward one another in a generally longitudinal direction, with a first of the die means including a number of die members or segments defining an opening therebetween for receiving a punch or ram on the other die means. The die members are generally laterally movable relative to one another, with an anvil being disposed within, and forming the bottom of, the opening.

A press is provided for forcibly moving the die means generally longitudinally (axially) toward one another (with the attachment portion of the fastener and the sheet material disposed therebetween) in order to force the attachment portion and a portion of the sheet material into the opening between the die members without shearing the sheet material, at least in the area of interlocking attachment. The attachment portion and a first part of the sheet material portion are pressed or squeezed generally longitudinally by the punch or ram into the opening and against the anvil in order to compress or laterally deform part of the sheet material portion (and in some cases the attachment portion) outwardly in order to form a longitudinal clinching interlock between the attachment portion and the sheet material. The die members, however, are resiliently biased laterally toward one another, and are forced laterally outwardly away from one another in response to such lateral outward deformation of the sheet material portion.

Preferably the transverse edge of the attachment portion of the fastener includes a surface discontinuity formed by knurling, for example, and a second part of the sheet material portion is forcibly urged into an interlocking engagement with such surface discontinuity. In some embodiments of the present invention, the attachment portion of the fastener is generally conical in shape, with the transverse edge being tapered outwardly in a direction toward the sheet material. In such embodiments, the second part of the sheet material portion is forcibly urged generally laterally inwardly to engage the tapered, transverse edge of the fastener attachment portion in order to form the above-mentioned interlock.

Furthermore, in other embodiments of the present invention, the attachment portion of the fastener can include a recessed area on the lateral face oriented toward the sheet material, and the above-mentioned first part of the sheet material portion is forcibly urged into such recessed area as it is being laterally deformed. The apparatus and method according to the present invention preferably includes the use of a stripper device for holding the interlocked fastener and sheet material portion substantially in contact or in engagement with the die members of the first die means while the second die means is moved longitudinally away after the fastener is attached to the sheet material.

Although the above-described apparatus, with laterally movable die members or segments, is the preferred apparatus for forming the joint or attachment of the present invention, alternate die apparatuses can also be employed. Such alternate apparatuses include those having a first die means that is solid (or non-segmented), and thus does not have laterally movable die members or segments, with the other die means including a punch or ram relatively movable in a longitudinal direction with respect to the first die means in a manner generally as described above. In such examples, the opening in the solid first die means must have outwardly tapered side walls, or at least walls that are parallel to the longitudinal axis, in order to allow the formed joint or attachment to be removed from the first die means. One skilled in the art will readily recognize from the following discussion that although the preferred apparatus described herein provides distinct advantages in forming the attachment or joint of the invention, other solid or laterally displaceable first die means can alternately be used.

Additional objects, advantages, and features of the present invention will become apparent from the following description and appended claims, taken in conjunction with the accompanying drawings.

BRIEF DESCRIPTION OF THE DRAWINGS

FIG. 1 is a perspective view of a fastener assembly according to the present invention, illustrating a female fastener secured to sheet material.

FIG. 2 is a cross-sectional view taken generally along line 2—2 of FIG. 1.

FIG. 3 is a cross-sectional view of an apparatus for forming the leakproof attachment of FIGS. 1 and 2 according to the present invention.

FIG. 8 is a perspective view of a fastener assembly according to the present invention similar to that of FIG. 1, but illustrating a male fastener secured to sheet material.

FIG. 9 is a cross-sectional view taken generally along line 9—9 of FIG. 8.

FIG. 10 is a view similar to that of FIG. 3, but partially illustrating an apparatus for forming the leakproof attachment shown in FIGS. 8 and 9.

FIG. 17 is a view similar to that of FIG. 16, but illustrating still another alternate embodiment of the invention, using the solid, or laterally non-displaceable, die means for forming a joint with a female fastener.

FIGS. 18 and 19 are view generally similar to those of FIGS. 3 and 4, but illustrating still another alternate embodiment of an apparatus for forming a leakproof attachment of a male fastener to a sheet material item according to the invention.

DETAILED DESCRIPTION OF THE PREFERRED EMBODIMENTS

Figure 4:
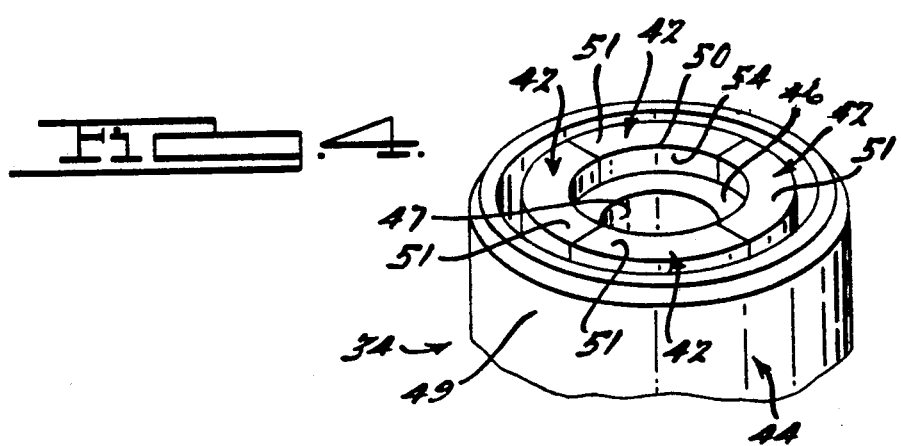
FIG. 4 is a perspective view of a portion of the apparatus of FIG. 3, illustrating a number of laterally movable die members resiliently biased laterally toward one another.

FIGS. 1 through 25 illustrate various exemplary embodiments of the present invention for purposes of illustration. One skilled in the art will readily recognize from the following discussion, taken together with the drawings and the appended claims, that the principles of the present invention are equally applicable to embodiments of the invention other than the illustrative examples shown in the drawings. One skilled in the art will also readily recognize that the principles of the present invention are applicable to both sheet metal and various other formable sheet materials, as well as either a single layer of such sheet materials or a number of sheet material items arranged in a multiple layer configuration.

FIGS. 1 and 2 illustrate a fastener assembly 10, in which a female fastener 12 is rigidly secured to a sheet material item 14. The preferred fastener 12 has a pair of circular lateral faces 16 interconnected by a transverse edge 18, which together define an attachment portion 25 of the fastener. Such attachment portion 25 of the fastener is preferably secured or attached to the sheet material 14 by way of the methods and apparatuses described below, in which the fastener 12 is forcibly urged into the sheet material 14 in order to deform a portion of the sheet material 14 into a generally cup-shaped configuration.

In most instances, the attachment is formed without shearing the sheet material 14, except for the opening 15 formed in the sheet material 14 by a piercing portion 17 on the female fastener 12. Once the fastener assembly 10 is formed, a male threaded member may be attached to the fastener assembly 10 by threadable engagement with a threaded opening 20 extending through the fastener 12. If a leakproof final assembly is desired, thread sealants can be applied to the threads, or an elastomeric or elastic gasket may be used, or a female fastener without the piercing portion 17 can be used to eliminate all shearing of sheet material 14, with a male threaded member threadably extending into such a female fastener, but not through the sheet material 14. In addition, the transverse edge 18 of the fastener 12 can be knurled or otherwise formed with one or more surface discontinuities 22 prior to forming the assembly 10 in order to strengthen attachment and substantially prevent rotation of the fastener 12 with respect to the sheet material 14 once the assembly 10 has been completed.

FIGS. 3 and 4 illustrate an exemplary attachment apparatus 30 for forming the fastener assembly 10 shown in FIGS. 1 and 2. One skilled in the art will readily recognize, however, that other similar apparatuses may be used to accomplish the objectives of the present invention, with the attachment apparatus 30 being shown merely for purposes of illustration.

The preferred attachment apparatus 30 includes an upper punch or die assembly 32 and a lower die assembly 34, with the sheet material 14 being insertable therebetween. The upper punch or die assembly 32 is operatively connected to a press apparatus (not shown), which drives it in a reciprocating manner in order to forcibly urge a punch or ram assembly 36 relatively toward and away from the lower die assembly 34. Preferably a stripper assembly 38 generally surrounds the punch 36 and is forcibly resiliently biased toward the lower die assembly 34 (preferably by compression spring 39) for purposes of securely holding the sheet material 14 in place between the upper punch or die assembly 32 and the lower die assembly 34, which also prevents reverse extrusion of the sheet material 14 toward the upper punch assembly 32 during the forming operation. The stripper assembly 38 also holds the fastener assembly 10 substantially in contact or engagement with the lower die assembly 34 during withdrawal of the punch 36, thereby substantially preventing hang-up of the punch 36 on the formed fastener assembly 10. Also, a preferred secondary punch or ram 37 is carried by the punch assembly 36 and is resiliently biased away from the lower die assembly 34, such as by way of a heavy compression spring 40. The secondary punch 37 serves to facilitate the removal of a portion of the sheet material 14 after the opening 15 is formed.

Figure 5:
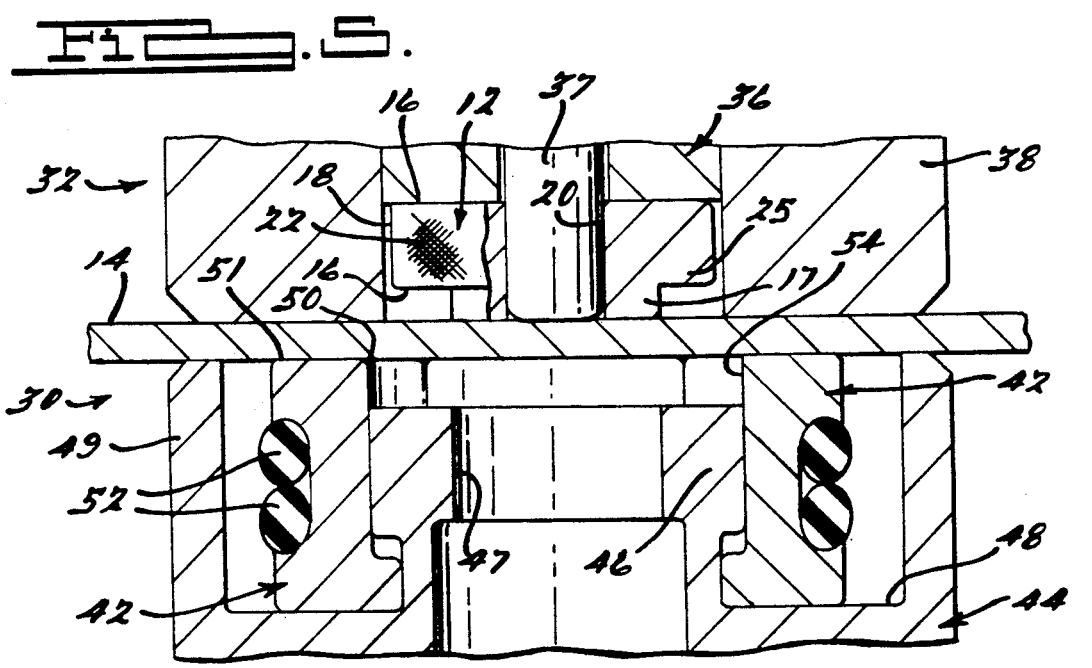
FIGS. 5 through 7 illustrate sequential steps in the forming of the leakproof attachment illustrated in FIGS. 1 and 2, using the apparatus shown in FIGS. 3 and 4.

Referring to FIGS. 3 and 5, the preferred lower die assembly 34 includes two or more generally arcuate die members or segments 42, which are disposed around a die body 44 that in turn includes a fixed anvil 46, with an opening 47 extending therethrough. The die segments 42 form an opening 54 and are longitudinally supported for transverse or lateral movement toward and away from one another by a shoulder 48 surrounding the anvil 46. The die segments 42 preferably have radiused edge portions 50 and substantially flat end faces 51, and are preferably uniformly spaced laterally from the punch 36 when the punch 36 is in the opening 54, in order to substantially avoid shearing or tearing of the sheet material 14 during deformation thereof, at least in the area of attachment with the fastener.

Although the die segments 42 are capable of moving laterally toward and away from one another, they are resiliently biased toward one another preferably by an elastic band or bands 52, which can have an elastomeric composition, a resilient elastic metallic composition, or other such resilient material compositions known to those skilled in the art. Such lateral movement of the die segments 42 toward and away from one another can be consist of a pivotal rocking of the die segments on the shoulder 48, a lateral sliding or translational movement of the die segments 42 on the shoulder 48, or even a combination of such pivotal and sliding movement. Protection for the die segments 42, as well as a limitation on their lateral or transverse movement can be accomplished by providing a sleeve portion 49 on the lower die assembly 34. In any event, the downward force exerted on the die segments 42 by the punch 36 will tend (at least initially) to close, rather than open, the lower die assembly 34. This is because most of the longitudinally supported engagement of the die segments 42 with the shoulder 48 is at a laterally-outward position relative to the edge portions 50 of the die segments 42. Furthermore, the shoulder 48 defines a solid surface easily capable of handling the axial loads on the die segments 42 during operation of the attachment apparatus 30.

The method and operation of the attachment apparatus 30 for forming the fastener assembly 10 is described below, with further reference to the sequential illustrations of FIGS. 5 through 8. As shown in FIG. 5, the punch 36 and the upper punch or die assembly 32 are forced toward the lower die assembly 34, with the fastener 12 and the sheet material 14 disposed therebetween. The stripper 38 contacts the sheet material 14 to hold it securely in place prior to the punch 36 urging the fastener 12 into contact with the sheet material 14.

Figure 6:
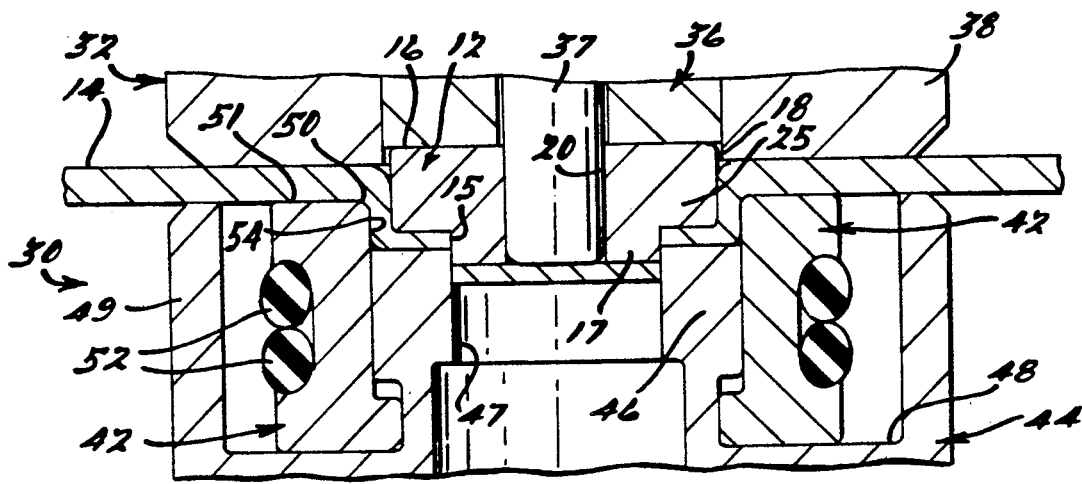

As shown in FIG. 6, continued movement of the punch 36 forcibly urges the fastener 12 and a portion of the sheet material 14 into the opening 54 defined by the die segments 42, with a portion of the sheet material 14 being drawn downwardly into contact with the upper surface of the anvil 46 as a result of the coaction of the punch 36 and the opening 54. There is preferably no fracturing or shearing of the sheet material 14, other than the forming of the opening 15 therein, due to the provision of the radiused edges 50 around the periphery of the opening 54 defined by the die segments 42 and due to the above-mentioned preferred uniform clearance between the die portions 42 and the punch 36.

Figure 7:
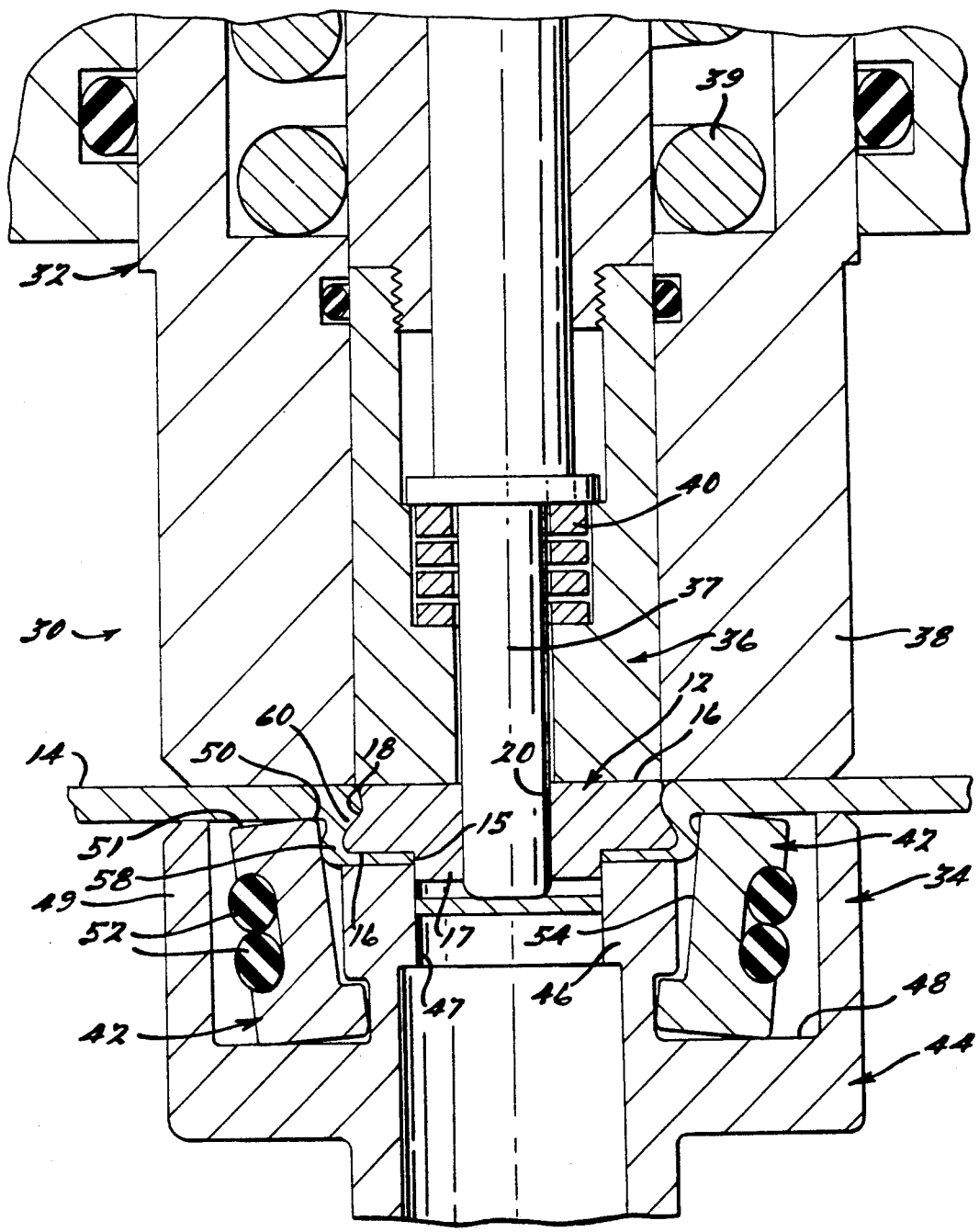
Figure 11:
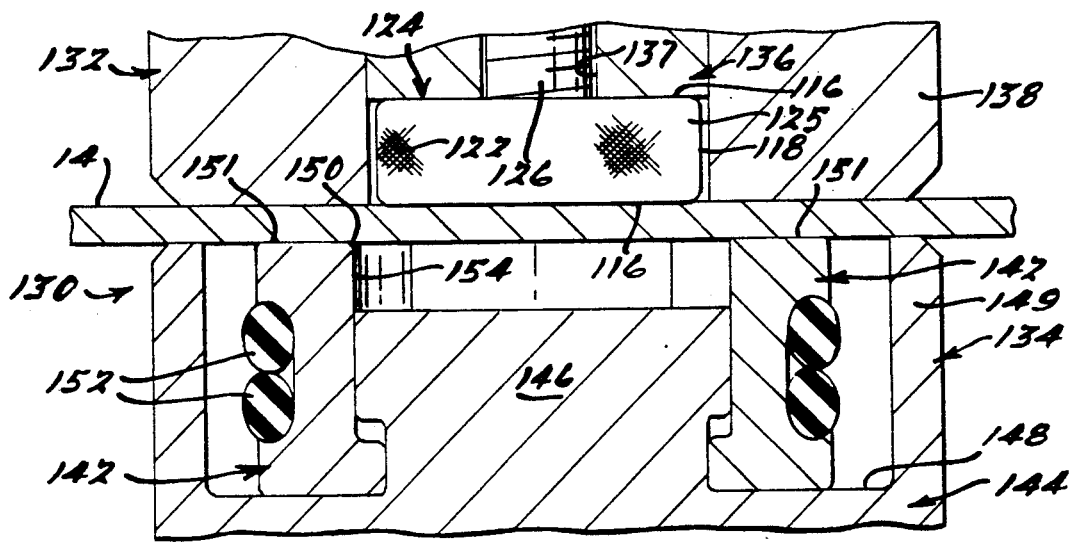
FIGS. 11 through 13 are views similar to those of FIGS. 5 through 7, but illustrate sequential steps in the forming of the leakproof attachment shown in FIGS. 8 and 9, using the apparatus shown in FIG. 10.
Figure 12:
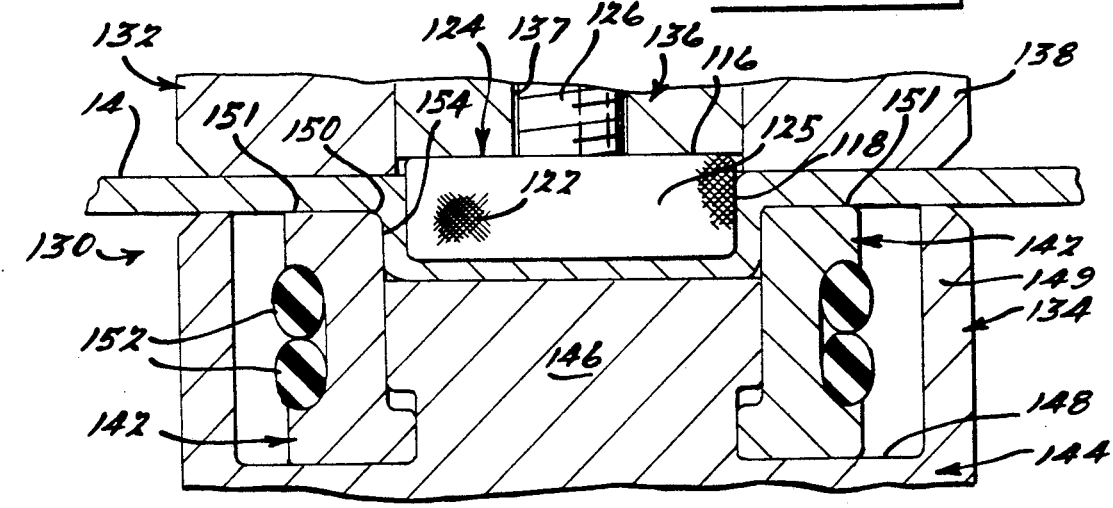

As shown in FIG. 7, the punch 36 continues to forcibly urge the fastener 12 against the fixed anvil 46 and reaches a distance from the anvil 46 that is less than the total combined original thickness of the sheet material portion 14 and the fastener 12. This causes at least a first part 58 of the drawn portion of the sheet material 14, and preferably part of the fastener 12 in this embodiment, to be squeezed or laterally extruded outwardly as they are pressed against the anvil 46. This transverse or lateral extrusion forms a laterally enlarged interlock between the fastener 12 and the drawn portion of the sheet material 14, preferably with the upper fastener face 16 being substantially flush with, or slightly below, the upper surface of the sheet material 14. In this regard, it should be noted that the representation of this laterally-enlarged mechanical interlock is not drawn to scale, but is exaggerated to provide a representative illustration of the cross-sectional configuration of the fastener assembly 10.

The force of the compression or lateral extrusion of the first part 58 of the drawn portion of the sheet material 14, as well as preferably a portion of the fastener 12, causes the die segments 42 to move laterally outwardly away from one another against the resilient inward biasing force of the preferred resilient, elastic bands 52. As mentioned above, the transverse edge 18 of the fastener 12 is preferably provided with a knurled portion or other surface discontinuity 22 (shown in FIGS. 2 and 5) such that during the formation of the fastener assembly 10, a second part 60 of the drawn portion of the sheet material 14 is forcibly urged into engagement with the knurling or discontinuity 22 on the transverse edge 18 of the fastener 12, thereby further enhancing the mechanical interlock between the fastener 12 and the sheet material 14 and substantially preventing relative rotation therebetween. Such continued movement of the punch assembly 36 also causes the secondary punch 37 to push away the sheared portion of the sheet material 14 through the opening 47, which results from the piercing portion 17 forming the opening In this regard, it should be emphasized that the heavy compression spring 40 (shown in FIGS. 3 and 7) is sufficiently stiff (high spring factor) to resist compression during the sequential forming steps shown in FIGS. 3, 5, and 6, and thus does not compressively deflect to any substantial extent or completely collapse until the forming sequence proceeds to the point shown in FIG. 7. At this point in the forming of the attachment, however, the preferred very stiff compression spring 40 completely collapses (preferably) as a result of the high forces required to cause the lateral extrusion of at least the first part 58 of the drawn portion of the sheet material portion 14 and, preferably, the part of the fastener 12 in this embodiment.

FIGS. 8 and 9 illustrate a leakproof fastener assembly 110 that is substantially similar to the fastener assembly 10 illustrated in FIGS. 1 and 2, except that the female fastener 12 is replaced by a male fastener 124 having an attachment portion 125, defined by the lateral faces 116 and the transverse edge 118, and a threaded stud portion 126 protruding therefrom. Because of such substantial similarities, elements in FIGS. 8 and 9, as well as the various other figures of the drawings that are substantially the same or functionally similar, are indicated by the same reference numerals or by similar reference numerals having one-hundred to eight-hundred prefixes.

FIGS. 10 through 13 illustrate another embodiment of an attachment apparatus according to the present invention, wherein the attachment apparatus 130 of FIGS. 10 through 13 is substantially similar to the attachment apparatus 30 of FIGS. 3 through 7, except that the punch assembly 36 of the attachment apparatus 30 is replaced by a punch assembly 136 having a central opening or recess 137 formed therein in order to accommodate the threaded stud portion 126 of the male fastener 124. In all other respects, the method and apparatus for forming the fastener assembly 110 is substantially the same as that described above in connection with the method and apparatus for forming the fastener assembly 10, except of course that the male fastener assembly 110 is leakproof, and there is no need to form the opening 15 in the sheet material 14, and thus there is no need for the opening 47 in the anvil 146.

Figure 14:
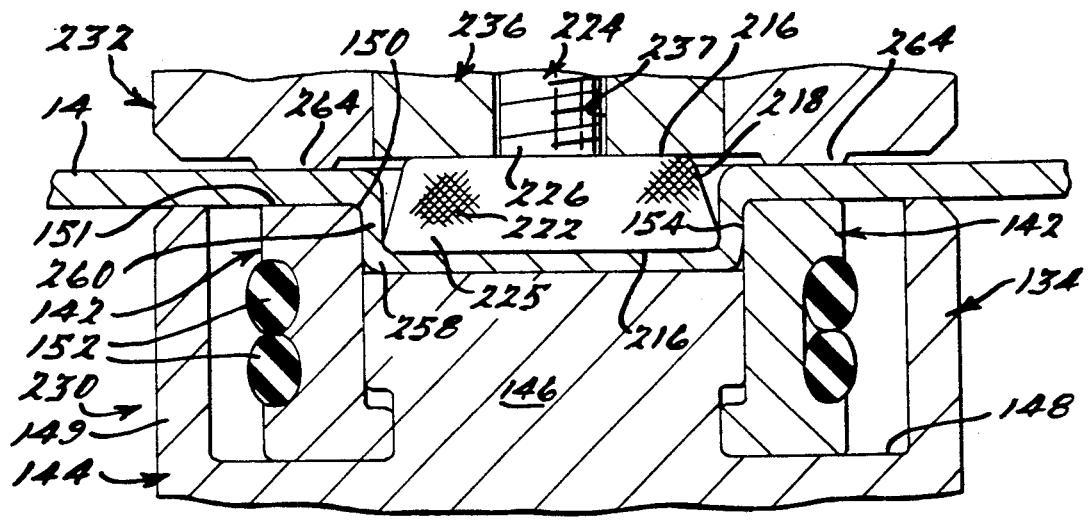
FIGS. 14 and 15 illustrate an alternate apparatus for forming an alternate embodiment of a leakproof attachment, and its operating sequence, according to the present invention.
Figure 15:
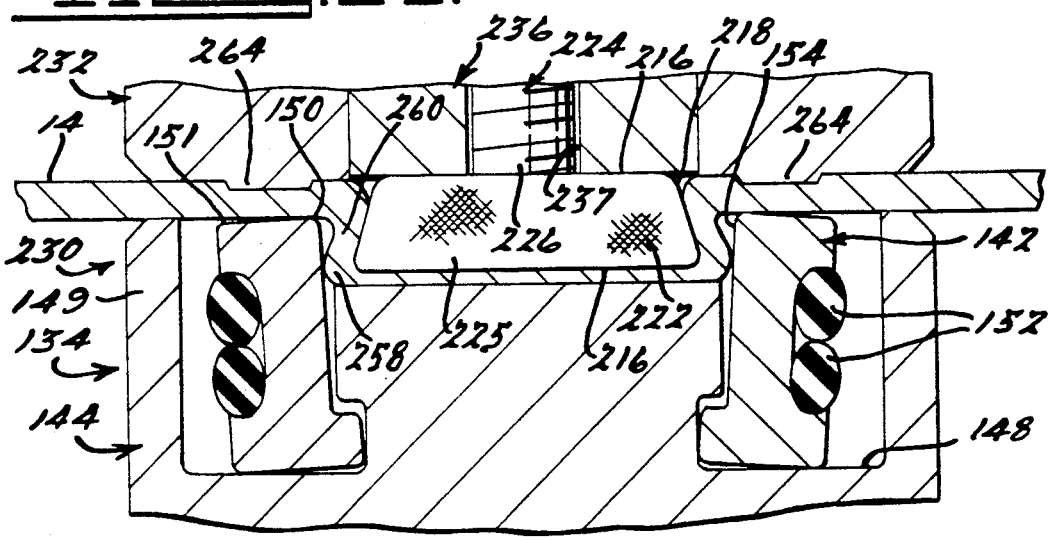

FIGS. 14 and 15 illustrate the formation of another embodiment of the present invention, which is applicable either to the fastener assembly 10 with its female fastener 12 or to the fastener assembly 110 with its male fastener 124, which are described above. A male fastener 224 is shown (merely for purposes of illustration) in FIGS. 14 and 15, and the attachment portion 225 of the male fastener 224 (or the entire female fastener 12) can be of a generally conical configuration, with the transverse edge 218 being tapered outwardly in a direction toward the sheet material 14.

In this embodiment, both first part 258 of the sheet material 14 and the attachment portion 225 of the fastener 224 can have portions laterally deformed outwardly, as described above, or alternatively as shown in FIGS. 14 and 15, the movement of the punch assembly 236 can be such as to laterally outwardly deform only the first part 258 of the drawn portion of the sheet material 14 with no outward deformation of the attachment portion 225 of the fastener 224. In either event, the punch assembly 236 includes an annular protrusion 264, preferably formed on the lower face of the stripper portion 232 of the punch assembly 236, such that continued downward movement of the punch assembly 236 forces the second part 60 of the drawn portion of the sheet material 14 laterally inwardly in order to be forcibly urged into engagement with the tapered transverse edge 218 of the attachment portion 225. In this embodiment, the outwardly-flared or outwardly-tapered configuration of the attachment portion 225 of the fastener 224 (or of the female fastener 12) further enhances the longitudinal mechanical interlock between the fastener and the sheet material, whether or not the attachment portion 225 (or the female fastener 12) is laterally deformed outwardly. Because of the conical configuration of the attachment portion in this embodiment, it is frequently unnecessary for the attachment portion to be laterally deformed or extruded outwardly, thus requiring less punch force in order to form the fastener assembly.

Figure 16:
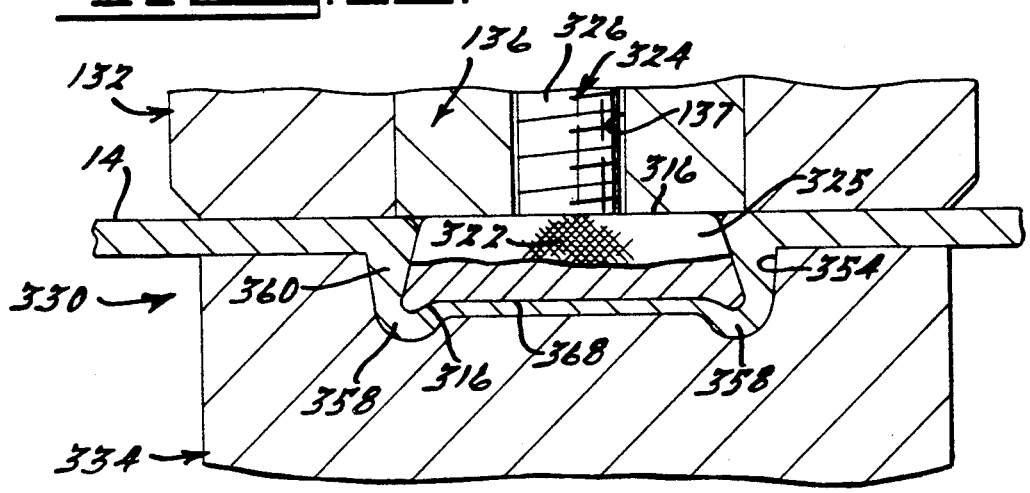
FIG. 16 is a view similar to that of FIG. 15, but illustrating still another exemplary alternate embodiment of the invention, using a solid, laterally non-displaceable die means for forming a leakproof attachment with a male fastener according to the present invention.

FIG. 16 illustrates still another embodiment of the present invention, which is also equally applicable to either the fastener assembly 10 with its female fastener 12 or the fastener assembly 110 with its male fastener 24, and this embodiment can also optionally be employed with or without lateral deformation of the attachment portion of the fastener. This embodiment of the present invention is substantially identical to that described above in connection with FIGS. 14 and 15, except that the lower face 316 of the attachment portion 325 (or the female fastener 12) is pre-formed with a recess 368 therein. Therefore as the punch 136 (or the punch 36 or 236) is forcibly urged downwardly in order to laterally outwardly deform the first part 358 of the drawn portion of the sheet material 14, a portion of the first part 358 is also squeezed or forcibly urged into the recess 368. Such engagement with the recess 368 also further enhances the mechanical interlock of the fastener assembly. If desired, the lower face 316 of the attachment portion 325 (or the female fastener 12) can also optionally be knurled or otherwise provided with surface discontinuities in order to similarly substantially prevent relative rotation between the fastener and the sheet material. Such knurling or surface discontinuity on the lower face 316 can optionally be included whether or not the recess 368 is provided, and whether or not the conical shape of the attachment portion illustrated in FIGS. 16 through 18 is employed.

Although the fastener assembly described above and illustrated in FIG. 16 can be formed with the above-described apparatus 230, it should be pointed out that any of the embodiments herein, or variations therein, can be formed using an alternate "solid", or laterally non-displaceable, lower die configuration 334 shown for purposes of illustration in FIG. 16. The die opening 354 in this embodiment is provided with outwardly and upwardly tapering side walls, or at least with side walls that are parallel to the longitudinal axis of the punch, so that the formed fastener-and-sheet material attachment can be removed after forming. A similar solid lower die configuration is known in the art for use in attaching two or more sheet material layers to one another, but has not previously been used (or adapted) for fastener attachment as disclosed herein.

In a similar example shown in FIG. 17, an optional fastener 412, having a piercing portion 417 on its inner face 416, is employed to punch or pierce a hole through a portion of the sheet material 14 in optional applications described above where the assembly is to be subsequently attached to a male threaded member that must extend into or through the sheet material adjacent the lower inner face 416. It should be noted, however, that the alternate apparatus 430, with the solid lower die assembly 434, unlike the lower die assembly 334, must include the opening 447 in the anvil portion 446.

In other respects, however, the forming of the fastener-to-sheet material attachments by the alternate apparatuses of FIGS. 16 and 17 is substantially similar to that described above, except that the above-described portions of the sheet material (or such portions of the sheet material and a part of the fastener attachment portion) are not squeezed or laterally extruded outwardly beyond the openings 354 or 454, respectively, to form the strong mechanical interlock that is characteristic of the present invention. This is due to the "solid" construction of the respective lower die apparatuses 334 or 434, which does not result in as strong of an attachment as do the other embodiments disclosed herein. The other features of the invention are, however, present in order to form a relatively secure attachment that is well-suited for many applications.

FIGS. 18 and 19 merely illustrate still another alternate apparatus 530 for forming the joint or attachment according to the present invention, with such apparatus 530 for attaching a male fastener being depicted in FIGS. 18 and 19 for purposes of illustration, even though a substantially similar apparatus can be readily recognized as being usable in forming the female fastener joint shown in FIG. 1. The apparatus 530 illustrated in FIGS. 18 and 19 functions substantially the same as those described above, and is described in the commonly-owned patents and applications mentioned above for the purpose of joining layers of sheet material layers without fasteners in some of such patents and applications. In addition, similar to the apparatuses described above and illustrated in FIGS. 3 through 7 and 10 through 17, the sleeve 49 shown in such figures, can also optionally be provided in the apparatus of FIGS. 18 and 19, if deemed desirable or necessary.

Figure 13:
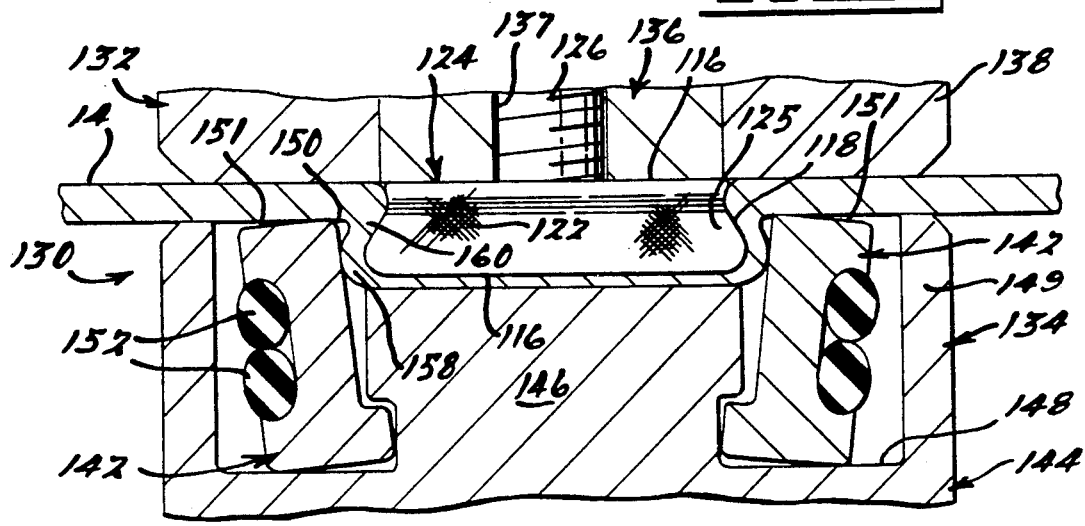
Figure 20:
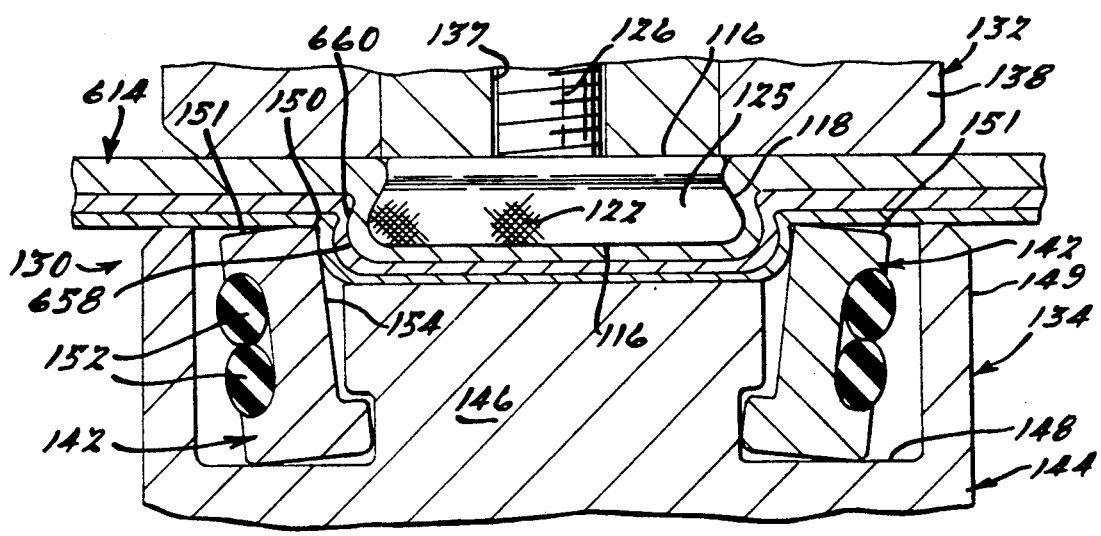
FIGS. 20 and 21 are views similar to those of FIGS. 13 and 7, respectively, but illustrating the apparatuses of FIGS. 13 and 7 for forming attachments of fasteners to multiple layer sheet material items.
Figure 21:
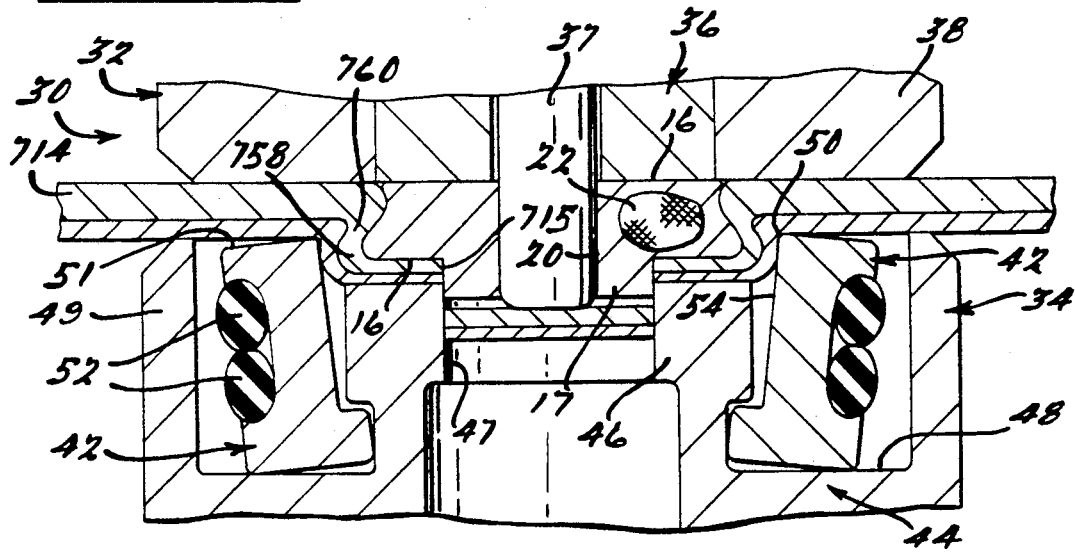

FIGS. 20 and 21 illustrate the apparatuses 130 and 30, respectively, for forming attachments similar to those shown in FIGS. 13 and 7, respectively, except that in FIG. 20, the single-layer sheet material 14 is replaced by the three-layer sheet material 614, and in FIG. 21 the sheet material 14 is replaced by the two-layer sheet material 714. In virtually all other respects, however, the function of the apparatuses depicted in FIGS. 20 and 21 are the same as those of FIGS. 13 and 7, respectively, and can be modified in accordance with the other embodiments disclosed herein. However, in any multiple-layer sheet material item having any number of layers, the present invention also interlocks the multiple layers to one another, at least in the area of the fastener joint.

Figure 22:
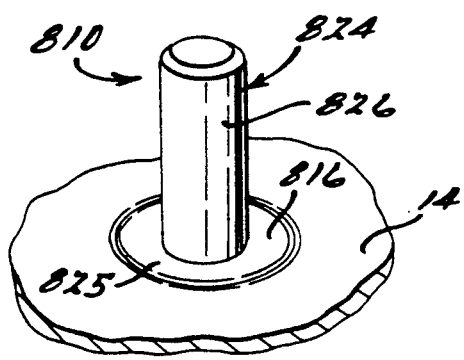
FIG. 22 is a view similar to that of FIG. 8, but illustrating the attachment of a pin or rod-like member, rather than a threaded fastener, to a sheet material item.

In FIG. 22, still another variation is depicted for purposes of example. The fastener assembly 810 is substantially the same as the fastener assembly 10 discussed above, except that the threaded stud portion 26 is replaced by a non-threaded shank or rod-like portion 826. This assembly can be advantageously employed in many applications, such as where another member having a hole therein is inserted onto the shank 826 for rotation thereabout or slidable movement thereon, for example. In this regard, a bushing or bearing having a non-threaded opening therein can be formed by way of the present invention to form an assembly similar to the assembly 10 of FIGS. 1 and 2, except that the opening 20 would not be threaded. This variation can also find many advantageous applications, such as where a rod or shank must be inserted into the non-threaded opening for rotation or slidable movement therein, for example.

Finally, FIGS. 23 through 26 illustrate lower die assemblies of still further alternate embodiments of the invention, depicted for use in attaching a male fastener 112 to a sheet material item 14. As with the other embodiments described above, the lower die assemblies illustrated in FIGS. 23 through 25, can also be employed for attaching female fasteners to sheet material items. In addition, the apparatuses shown in FIGS. 23 through 25 function in a manner similar to that described above, and thus the components of the apparatuses of FIGS. 23 through 25 that correspond to those of the other embodiments discussed above are indicated by like reference numerals, but with nine-hundred, one-thousand, and eleven-hundred prefixes, respectively.

Figure 23:
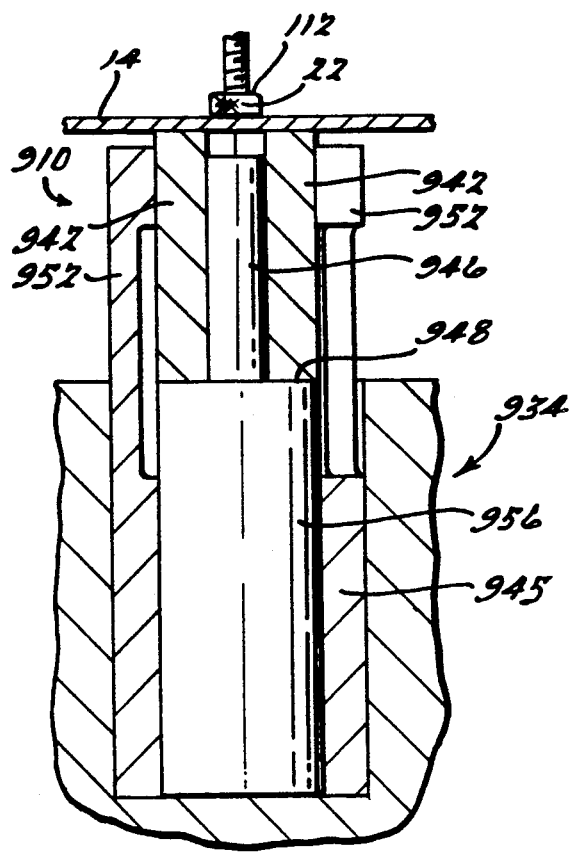
FIG. 23 is a lateral cross-sectional view of another alternate embodiment of the invention, wherein the lower die assembly includes a number of spring-loaded fingers employed for biasing the dies laterally inwardly.

In FIG. 23, the apparatus 910 includes a lower die assembly 934 having an anvil base 956, an anvil 946, and two or more laterally expandable die members 942 which fully surround the anvil 946 and sit on the shoulder 948 of the anvil base 956. The die members 942 are surrounded by a retaining sleeve 945 having a plurality of equally spaced resilient integral collet-like fingers 952 which bias the dies radially inwardly. A similar lower die assembly is disclosed in U.S. Pat. No. 4,803,767 for use in forming a joint between two pieces of sheet material.

Figure 24:
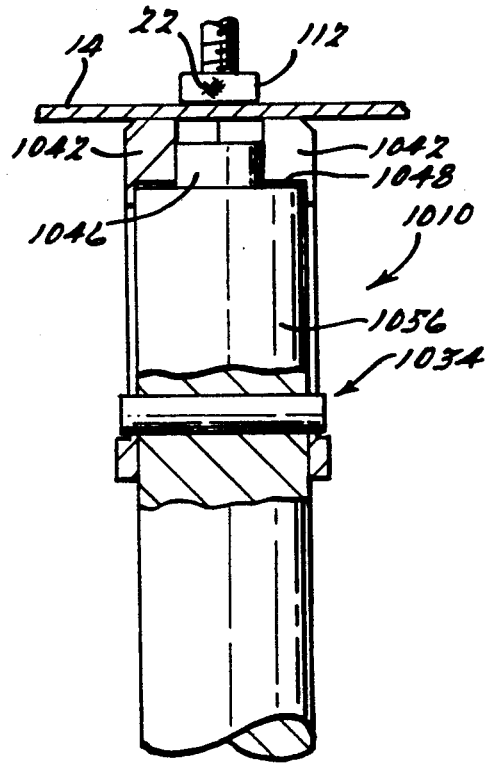
FIG. 24 is a view similar to that of FIG. 23, but illustrating a further alternate embodiment wherein the lower die assembly includes resilient, collet-type die members.

In FIG. 24, the lower die assembly 1034 of the apparatus 1010 includes a plurality of integral collet-type die members 1042 that are themselves resilient, fully surrounding the anvil 1046, and thus are self-biasing inwardly without the use of an external or separate biasing means. The forming portions of the die members 1042 are longitudinally supported by a shoulder portion 1048, between the anvil 1046 and the anvil base 1056, to resist or restrain downward movement during the forming operation. A similar lower die apparatus is disclosed in U.S. Pat. No. 4,208,776 for forming a joint between two pieces of sheet material, but the disclosure of such patent relates to such apparatus that shears the sheet material along two sides as it is drawn into the opening between the die members. In the present invention, however, as is discussed more fully above, no such shearing of the drawn sheet material 14 by way of interaction of the die members 1042 and the punch occurs.

Figure 25:
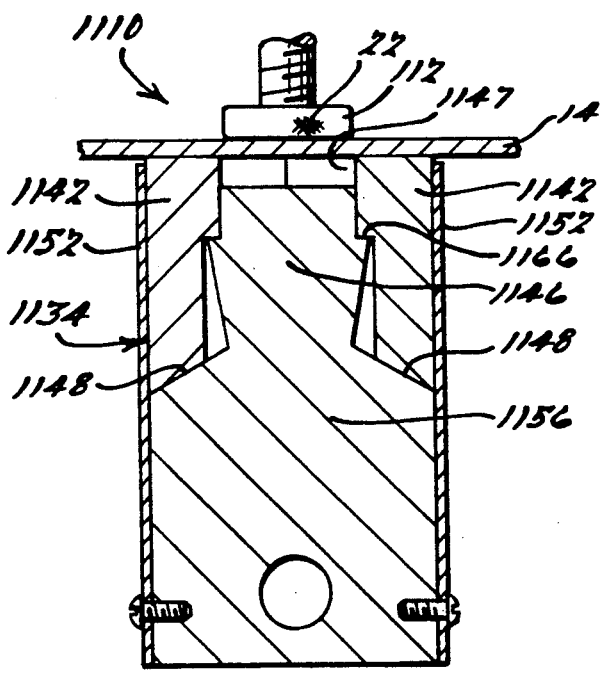
FIG. 25 is a view similar to those of FIGS. 23 and 24, but illustrating another alternate lower die assembly having die members that are slidably movable on inclined supporting surfaces.

The apparatus 1110 of FIG. 25 includes a lower die assembly 1134 having die members 1142 on either side an anvil 1146, and biased laterally inwardly by resilient members 1152, which act like leaf springs that are laterally deflectable, but fastened at their lower ends to the anvil base 1156. An opening 1147 is formed by preferred semi-circular recesses in each of the die members 1142, into which the sheet material 14 and the fastener 112 (or 12) are forced during the forming operation. The die members 1152 are supported on stepped portions 1166 of the anvil base 1156 until they are urged laterally outwardly to slidingly clear the stepped portions 1166, after which they slide and further separate laterally outwardly and longitudinally downwardly on inclined supporting surfaces 1148, as is disclosed in U.S. Pat. No. 4,972,565 for a similar apparatus, but adapted for joining two sheet material items.

The foregoing discussion discloses and describes merely exemplary embodiments of the present invention for purposes of illustration only. One skilled in the art will readily recognize from such discussion, and from the accompanying drawings and claims, that various changes, modifications, and variations may be made therein without departing from the spirit and scope of the invention as defined in the following claims.

What is claimed is:

1. An apparatus for forming an attachment of an item to a sheet material, said item having an attachment portion with a lateral face and a transverse edge thereon, said apparatus comprising:
   punch means;
   die means defining an opening therein, and a fixed anvil disposed within said opening and defining the bottom thereof;
   press means for forcibly moving said punch means generally longitudinally toward one another with said attachment portion and said sheet material therebetween in order to force said attachment portion and a portion of said sheet material into said opening without shearing said sheet material and for forcibly pressing said attachment portion and a first part of said sheet material portion generally longitudinally against said fixed anvil to laterally deform said first part of said sheet material portion generally laterally outwardly in order to longitudinally interlock said attachment portion with said sheet material, said lateral deformation occuring without shearing said first part of said sheet material portion, said die means including a number of die members defining said opening, said die members being laterally movable relative to one another generally laterally outwardly away from one another in response to said lateral deformation.

2. An apparatus according to claim 1, further including resilient biasing means for resiliently biasing said die members generally laterally toward one another.

3. An apparatus according to claim 2, wherein said resilient biasing means includes a resilient band generally surrounding die members.

4. An apparatus according to claim 1, wherein said item is a male threaded fastener.

5. An apparatus according to claim 1, wherein said item is a female threaded fastener.

6. An apparatus according to claim 1, wherein said item includes a rod-like pin protruding from said attachment portion.

7. An apparatus according to claim 1, wherein said transverse edge of said attachment portion of said fastener includes at least one surface discontinuity thereon, said apparatus further including means for urging a second part of said sheet material portion into an interlocking engagement with said surface discontinuity.

8. An apparatus according to claim 7, wherein said attachment portion is generally round in shape, said transverse edge extending circumferentially therearound, said interlocking engagement of said second part of said sheet material portion and said surface discontinuity substantially preventing rotation of said attachment portion relative to said sheet material.

9. An apparatus according to claim 8, wherein said surface discontinuity includes a knurled portion of said transverse edge.

10. An apparatus according to claim 1, wherein said press means further laterally deforms said attachment portion generally outwardly during said lateral deformation of said sheet material portion in order to form said longitudinal interlock of said attachment portion with said sheet material.

11. An apparatus according to claim 1, wherein said attachment portion is generally conical in shape, said transverse edge being tapered generally outwardly in a direction toward said sheet material, said apparatus further including means for forcibly urging a second part of said sheet material portion generally laterally inwardly to engage said tapered transverse edge in order to form said longitudinal interlock of said attachment portion with said sheet material.

12. An apparatus according to claim 11, wherein said tapered transverse edge includes at lease one surface discontinuity thereon, said second part of said sheet material portion being urged generally laterally inwardly to interlockingly engage said surface discontinuity.

13. An apparatus according to claim 11, wherein said lateral face of said attachment portion includes a recessed area thereon, said apparatus further including means for forcibly urging said first part of said sheet material portion into said recessed area during said lateral deformation.

14. An apparatus according to claim 13, wherein said tapered transverse edge includes at least one surface discontinuity thereon, said second part of said sheet material portion being urged generally laterally to interlockingly engage said surface discontinuity.

15. An apparatus for forming an attachment of an item to a sheet material, said item having an attachment portion with a lateral face and a transverse edge thereon, said apparatus comprising:
   punch means;
   die means defining an opening therein, and a fixed anvil disposed within said opening and defining the bottom thereof;
   press means for forcibly moving said punch means generally longitudinally toward one another with said attachment portion and said sheet material therebetween in order to force said attachment portion and a portion of said sheet material into said opening without shearing said sheet material and for forcibly pressing said attachment portion and a first part of said sheet material portion generally longitudinally against said fixed anvil to laterally deform said first part of said sheet material portion generally laterally outwardly in order to longitudinally interlock said attachment portion with said sheet material, said lateral deformation occurring without shearing said first part of said sheet material portion, said attachment being formed without shearing any part of said sheet material.

16. An apparatus for forming an attachment of an item to a sheet material, said item having an attachment portion with a lateral face and a transverse edge thereon, said apparatus comprising:
   punch means;
   die means defining an opening therein, and a fixed anvil disposed within said opening and defining the bottom thereof;
   press means for forcibly moving said punch means generally longitudinally toward one another with said attachment portion and said sheet material therebetween in order to force said attachment portion and a portion of said sheet material into said opening without shearing said sheet material and for forcibly pressing said attachment portion and a first part of said sheet material portion generally longitudinally against said fixed anvil to laterally deform said first part of said sheet material portion generally laterally outwardly in order to longitudinally interlock said attachment portion with said sheet material, said lateral deformation occurring without shearing said first part of said sheet material portion, said apparatus including stripper means for holding said sheet material in place between said punch means and said die means during the forming of said attachment and for holding said interlocked item and said sheet material portion substantially in contact with said die means while said punch means is moved longitudinally away from said die means after said item is attached to said sheet material.

17. An apparatus according to claim 16, wherein said attachment said portion is generally conical in shape, said transverse edge being tapered generally outwardly in a direction toward said sheet material, said stripper means including means for forcibly urging a second part of said sheet material portion generally laterally inwardly to engage said tapered transverse edge in order to form said longitudinal interlock of said attachment portion with said sheet material.

18. An apparatus according to claim 17, wherein said stripper means includes a protuberance protruding in a generally longitudinal direction toward said sheet material.

19. An apparatus for forming an attachment of a fastener to a sheet material, said fastener having an attachment portion with a lateral face and a transverse edge thereon, said apparatus comprising:
punch means;
die means including a number of die members defining an opening therebetween, said die members being generally laterally movable relative to one another, and a fixed anvil disposed within said opening and defining the bottom thereof;
press means for forcibly moving said punch means and said die means generally longitudinally toward one another with said attachment portion and said sheet material therebetween in order to force said attachment portion and a portion of said sheet material into said opening and for forcibly pressing said attachment portion and a first part of said sheet material portion generally longitudinally against said anvil to laterally deform said first part of said sheet material portion generally laterally outwardly and to deform a second part of said sheet material portion against said transverse edge in order to longitudinally interlock said attachment portion with said sheet material, said die members being movable generally laterally outwardly away from one another in response to said lateral deformation, said lateral deformation occurring without shearing said first part of said sheet material portion; and
resilient biasing means for resiliently biasing said die members generally laterally toward one another.

20. An apparatus according to claim 19, wherein said transverse edge of said attachment portion of said fastener includes at least one surface discontinuity thereon, said apparatus further including means for urging a second part of said sheet material portion into an interlocking engagement with said surface discontinuity without shearing said second part of said sheet material portion.

21. An apparatus according to claim 20, wherein said attachment portion is generally round in shape, said transverse edge extending circumferentially therearound, said interlocking engagement of said second part of said sheet material portion and said surface discontinuity substantially preventing rotation of said attachment portion relative to said sheet material.

22. An apparatus according to claim 21, wherein said surface discontinuity includes a knurled portion of said transverse edge.

23. An apparatus according to claim 19, wherein said press means further laterally deforms said attachment portion generally outwardly during said lateral deformation of said sheet material portion in order to form said longitudinal interlock of said attachment portion with said sheet material.

24. An apparatus according to claim 19, wherein said attachment portion is generally conical in shape, said transverse edge being tapered generally outwardly in a direction toward said sheet material, said apparatus further including means for forcibly urging a second part of said sheet material portion generally laterally inwardly to engage said tapered transverse edge in order to form said longitudinal interlock of said attachment portion with said sheet material without shearing said second part of said sheet material portion.

25. An apparatus according to claim 24, wherein said tapered transverse edge includes at least one surface discontinuity thereon, said second part of said sheet material portion being urged generally laterally inwardly to interlockingly engage said surface discontinuity.

26. An apparatus according to claim 24, wherein said lateral face of said attachment portion includes a recessed area thereon, said apparatus further including means for forcibly urging said first part of said sheet material portion into said recessed area during said lateral deformation.

27. An apparatus according to claim 26, wherein said tapered transverse edge includes at least one surface discontinuity thereon, said second part of said sheet material portion being urged generally laterally inwardly to interlockingly engage said surface discontinuity.

28. An apparatus according to claim 19, wherein said attachment is formed without shearing any part of said sheet material.

29. An apparatus according to claim 19, wherein said apparatus includes stripper means for holding said sheet material in place between said punch means and said die means during the forming of said attachment and for holding said fastener and sheet material portion substantially in contact with said die means while said punch means is moved longitudinally away from said die means after said fastener is attached to said sheet material.

30. An apparatus according to claim 29, wherein said attachment portion is generally conical in shape, said transverse edge being tapered generally outwardly in a direction toward said sheet material, said stripper means including means for forcibly urging a second part of said sheet material portion generally laterally inwardly to engage said tapered transverse edge in order to form said longitudinal interlock of said attachment portion with said sheet material.

31. An apparatus according to claim 30, wherein said stripper means includes a protuberance protruding in a generally longitudinal direction toward said sheet material.

32. An apparatus according to claim 19, wherein said attachment portion of said fastener has a threaded opening extending therethrough.

33. An apparatus according to claim 19, wherein said attachment portion of said fastener has a threaded protuberance extending therefrom.

34. An apparatus according to claim 33, wherein said attachment is formed without shearing any part of said sheet material.

35. An apparatus for forming an attachment of a fastener to a sheet material, said fastener having an attachment portion with a lateral face and a transverse edge thereon, said apparatus comprising:
punch means;
die means including a number of die members defining an opening therebetween, said die members being generally laterally movable relative to one another, and a fixed anvil disposed within said opening and defining the bottom thereof;
press means for forcibly moving said punch means and said die means generally longitudinally toward one another with said attachment portion and said sheet material therebetween in order to force said attachment portion and a portion of said sheet material into said opening and for forcibly pressing said attachment portion and a first part of said sheet material portion generally longitudinally against said anvil to laterally deform both said first part of said sheet material portion and said attachment portion generally laterally outwardly and to deform a second part of said sheet material portion against said transverse edge in order to longitudinally interlock said attachment portion with said sheet material, said die members being movable generally laterally outwardly away from one another in response to said lateral deformation, said lateral deformation occurring without shearing said first part of said sheet material portion; and
resilient biasing means for resiliently biasing said die members generally laterally toward one another.

36. An apparatus according to claim 35, wherein said transverse edge of said attachment portion of said fastener includes at least one surface discontinuity thereon, said apparatus further including means for urging a second part of said sheet material portion into an interlocking engagement with said surface discontinuity during said lateral deformation without shearing said second part of said sheet material portion.

37. An apparatus according to claim 36, wherein said attachment portion is generally round in shape, said transverse edge extending circumferentially therearound, said interlocking engagement of said second part of said sheet material portion and said surface discontinuity substantially preventing rotation of said attachment portion relative to said sheet material.

38. An apparatus according to claim 37, wherein said surface discontinuity includes a knurled portion of said transverse edge.

39. An apparatus according to claim 35, wherein said lateral face of said attachment portion includes a recessed area thereon, said apparatus further including means for forcibly urging said first part of said sheet material portion into said recessed area during said lateral deformation.

40. An apparatus according to claim 35, wherein said attachment is formed without shearing any part of said sheet material.

41. An apparatus according to claim 35, wherein said apparatus includes stripper means for holding said sheet material in place between said punch means and said die means during the forming of said attachment and for holding said fastener and sheet material portion substantially in contact with said die means while a said punch means is moved longitudinally away from said die means after said fastener is attached to said sheet material.

42. An apparatus according to claim 35, wherein said attachment portion of said fastener has a threaded opening extending therethrough.

43. An apparatus according to claim 35, wherein said attachment portion of said fastener has a threaded protuberance extending therefrom.

44. An apparatus according to claim 43, wherein said attachment is formed without shearing any part of said sheet material.

45. An apparatus for forming an attachment of a fastener to a sheet material, said fastener having an attachment portion of a generally conical shape with a lateral face and a tapered transverse edge thereon, said apparatus comprising:
punch means;
die means including a number of die members defining an opening therebetween, said die members being generally laterally movable relative to one another, and a fixed anvil disposed within said opening and defining the bottom thereof;
press means for forcibly moving said punch means and said die means generally longitudinally toward one another with said attachment portion and said sheet material therebetween in order to force said attachment portion and a portion of said sheet material into said opening and for forcibly pressing said attachment portion and a first part of said sheet material portion generally longitudinally against said anvil for laterally deforming said first part of said sheet material portion generally laterally outwardly and to deform a second part of said sheet material portion against said transverse edge in order to longitudinally interlock said attachment portion with said sheet material, said die members being movable generally away from one another in response to said lateral deformation, lateral deformation occurring without shearing said first part of said sheet material portion;
means for forcibly urging a second part of said sheet material portion generally laterally inwardly to engage said tapered transverse edge of said attachment portion in order to form said longitudinal interlock; and
resilient biasing means for resiliently biasing said die members generally laterally toward one another.

46. An apparatus according to claim 45, wherein said tapered transverse edge of said attachment portion of said fastener includes at least one surface discontinuity thereon, said apparatus further including means for urging said second part of said sheet material portion into an interlocking engagement with said surface discontinuity when said second part of said sheet material portion is forcibly urged into engagement with said tapered transverse edge without shearing said second part of said sheet material portion.

47. An apparatus according to claim 46, wherein said generally conical attachment portion is of a generally circular conical shape, said tapered transverse edge extending circumferentially therearound, said interlocking engagement of said second part of said sheet material portion and said surface discontinuity substantially preventing rotation of said attachment portion relative to said sheet material.

48. An apparatus according to claim 47, wherein said surface discontinuity includes a knurled portion of said edge.

49. An apparatus according to claim 45, wherein said apparatus includes stripper means for holding said sheet material in place between said punch means and said die means during the forming of said attachment and for holding said fastener and sheet material portion substantially in contact with said die means while said punch means is moved longitudinally away from said die means after said fastener is attached to said sheet material.

50. An apparatus according to claim 49, wherein said stripper means includes said means for forcibly urging said second part of said sheet material portion laterally inwardly to engage said tapered transverse edge of said attachment portion.

51. An apparatus according to claim 50, wherein said stripper means includes a protuberance protruding in a generally longitudinal direction toward said sheet material.

52. An apparatus according to claim 45, wherein said attachment is formed without shearing any part of said sheet material.

53. An apparatus according to claim 45, wherein said attachment portion of said fastener has a threaded opening extending therethrough.

54. An apparatus according to claim 45, wherein said attachment portion of said fastener has a threaded protuberance extending therefrom.

55. An apparatus according to claim 54, wherein said attachment is formed without shearing any part of said sheet material.

56. An apparatus for forming an attachment of a fastener to a sheet material, said fastener having an attachment portion of a generally conical shape with a recessed lateral face and a tapered transverse edge thereon, said apparatus comprising:
punch means;
die means including a number of die members defining an opening therebetween, said die members being generally laterally movable relative to one another, and a fixed anvil disposed within said opening and defining the bottom thereof;
press means for forcibly moving said punch means and said die means generally longitudinally toward one another with said attachment portion and said sheet material therebetween in order to force said attachment portion and a portion of said sheet material into said opening and for forcibly pressing said attachment portion and a first part of said sheet material portion generally longitudinally against said anvil for laterally deforming said first part of said sheet material portion generally laterally outwardly and for forcibly urging said first part of said sheet material portion into said recess on said lateral face in order to longitudinally interlock said attachment portion with said sheet material, said die members being movable generally away from one another in response to said lateral deformation, said lateral deformation occurring without shearing said first part of said sheet material portion;
means for forcibly urging a second part of said sheet material portion generally laterally inwardly to engage said tapered transverse edge of said attachment portion in order to form said longitudinal interlock; and
resilient biasing means for resiliently biasing said die members generally laterally toward one another.

57. An apparatus according to claim 56, wherein said tapered transverse edge of said attachment portion of said fastener includes at least one surface discontinuity thereon, said apparatus further including means for urging said second part of said sheet material portion into an interlocking engagement with said surface discontinuity when said second part of said sheet material portion is forcibly urged into engagement with said tapered transverse edge without shearing said second part of said sheet material portion.

58. An apparatus according to claim 57, wherein said generally conical attachment portion is of a generally circular conical shape, said tapered transverse edge extending circumferentially therearound, said interlocking engagement of said second part of said sheet material portion and said surface discontinuity substantially preventing rotation of said attachment portion relative to said sheet material.

59. An apparatus according to claim 58, wherein said surface discontinuity includes a knurled portion of said edge.

60. An apparatus according to claim 56, wherein said apparatus includes stripper means for holding said sheet material in place between said punch means and said die means during the forming of said attachment and for holding said fastener and sheet material portion substantially in contact with said die means while said punch means is moved longitudinally away from said die means after said fastener is attached to said sheet material.

61. An apparatus according to claim 60, wherein said stripper means includes said means for forcibly urging said second part of sheet material portion laterally inwardly to engage said tapered transverse edge of said attachment portion.

62. An apparatus according to claim 61, wherein said stripper means includes a protuberance protruding in generally longitudinal direction toward said sheet material.

63. An apparatus according to claim 56, wherein said attachment is formed without shearing any part of said sheet material.

64. An apparatus according to claim 56, wherein said attachment portion of said fastener has a threaded opening extending therethrough.

65. An apparatus according to claim 56, wherein said attachment portion of said fastener has a threaded protuberance extending therefrom.

66. An apparatus according to claim 65, wherein said attachment is formed without shearing any part of said sheet material.

* * * * *

UNITED STATES PATENT AND TRADEMARK OFFICE
CERTIFICATE OF CORRECTION

PATENT NO. : 5,208,974  
DATED : May 11, 1993  
INVENTOR(S) : Stephen E. Sawdon et al Page 1 of 2

It is certified that error appears in the above-indentified patent and that said Letters Patent is hereby corrected as shown below:

On the Title page under "Inventors:", "Stephen B. Sawdon" should be -- Stephen E. Sawdon --.

On the Title page under U.S. Patent Documents, reference 1,969,214, "Daude" should be -- Dit Daude --.

On the Title page under U.S. Patent Documents, reference 2,937,681, "Pattern" should be -- Patten --.

On the Title page under "Other Publications", second document, "Lance-n-Loc" should be -- LANCE-N-LOC --.

On the Title page under "Other Publications", third reference, "Tog-I-Loc" should be -- TOG-L-LOC --.

Column 5, line 54, "be" should be deleted.

Column 6, line 20, "th" should be -- the --.

Column 6, line 68, after "opening" under -- 15 --.

Column 8, line 48, "therein" should be -- thereon --.

Column 10, line 3, "26" should be -- 25 --.

Column 10, line 48, after "side" insert -- of --.

Column 11, line 11, after "thereof;" insert -- and --.

Column 11, line 12, after "punch means" insert -- and said die means --.

Column 11, line 25, "occuring" should be -- occurring --.

UNITED STATES PATENT AND TRADEMARK OFFICE
CERTIFICATE OF CORRECTION

PATENT NO. : 5,208,974
DATED : May 11, 1993
INVENTOR(S) : Stephen B. Sawdon et al It is certified that error appears in the above-indentified patent and that said Letters Patent is hereby corrected as shown below:

Column 12, line 9, "lease" should be -- least --.

Column 12, line 23, after "laterally" insert -- inwardly --.

Column 12, line 32, after "thereof;" insert -- and --.

Column 12, line 33, after "punch means" insert -- and said die means --.

Column 12, line 57, after "thereof;" insert -- and --.

Column 12, line 58, after "punch means" insert -- and said die means --.

Column 16, line 41, after "deformation," insert -- said --.

Signed and Sealed this

Tenth Day of May, 1994

Attest:

BRUCE LEHMAN

*Attesting Officer*  *Commissioner of Patents and Trademarks*